United States Patent [19]

Sheptak et al.

[11] 4,172,915

[45] Oct. 30, 1979

[54] THERMAL INSULATION

[75] Inventors: Nicholas Sheptak, Appleton; James E. Dewine, North Olmstead, both of Ohio

[73] Assignee: American Can Company, Greenwich, Conn.

[21] Appl. No.: 929,305

[22] Filed: Jul. 31, 1978

[51] Int. Cl.² .................. B32B 1/04; B32B 3/02; B32B 15/08
[52] U.S. Cl. .................. 428/69; 52/406; 428/75; 428/461; 428/516; 428/920; 418/483
[58] Field of Search .................. 428/69, 75, 920, 461; 52/406; 220/422, 467

[56] References Cited

U.S. PATENT DOCUMENTS

| | | | |
|---|---|---|---|
| 2,779,066 | 1/1957 | Gaugler et al. | 52/406 |
| 2,817,123 | 12/1957 | Jacobs | 20/4 |
| 2,817,124 | 12/1957 | Dybvig | 428/69 X |
| 2,863,179 | 12/1958 | Gaugler | 52/406 |
| 2,939,811 | 6/1960 | Dillon | 428/69 |
| 2,966,439 | 12/1960 | Sorel | 154/139 |
| 3,004,877 | 10/1961 | Simms et al. | 428/69 |
| 3,264,165 | 8/1966 | Stickel | 428/69 |
| 4,054,711 | 10/1977 | Bolsolas | 428/920 X |

Primary Examiner—George F. Lesmes
Assistant Examiner—Daniel R. Zirker
Attorney, Agent, or Firm—Robert P. Auber; Ira S. Dorman; Harry W. Hargis, III

[57] ABSTRACT

A hermetically sealed pouch encloses both a porous mass of material of relatively low heat conductivity and a charge of a gas having a coefficient of thermal conductivity lower than that of air and thoroughly permeating the porous mass of material. The pouch is constructed of confronting sheets of multi-ply laminate material sealed along free edge portions thereof, and comprising an inwardly facing sealing layer of 15 pounds per ream low density polyethylene, a layer of 0.5 pounds per ream vinyl primer, a layer of 0.35 mil aluminum foil, a layer of 9 pounds per ream white low density polyethylene, and an outwardly facing layer of polymeric material selected from the group consisting of polyester and oriented polypropylene.

8 Claims, 2 Drawing Figures

THERMAL INSULATION

BACKGROUND OF THE INVENTION

This invention relates to thermal insulation, and particularly to improvements in gas impervious pouch structure for containing a porous mass of thermal insulation and a charge of gas having a coefficient of thermal conductivity lower than that of air.

Pouch structures containing insulation and gas as described have been found useful as insulation units for installation in the walls and doors of refrigerator cabinets. Such units both facilitate handling of the insulation and enhance performance of refrigerator cabinets and the like within which they are installed. These insulation units also have been found useful for other home appliances, such as, for example, freezers and water heaters, as well as for residential and commercial building structures.

Fibrous insulation comprising glass fibers or the like, in combination with an insulating gas such as difluorodichloromethane, commonly known as F-12 refrigerant, and enclosed in pouch structures of materials that are both gas and moisture impervious, have been used. Pouch materials have comprised laminae of: Mylar (a polyester of ethylene glycol and terephthalic acid) and Saran (a vinyl and vinylidine chloride copolymer), as taught by U.S. Pat. Nos. 2,817,123 and 2,817,124; Saran and paper, as taught by U.S. Pat. No. 2,966,439; paper, polyethylene and Saran, as taught by U.S. Pat. No. 3,004,877; and Mylar and vapor deposited aluminum as taught by U.S. Pat. No. 2,863,179.

The hereinabove identified patents are believed material to the examination of this application, for reasons briefly stated, and it is a general objective of this invention to provide an insulative unit of the pouch enclosed type that affords improved handling and performance characteristics.

SUMMARY OF THE INVENTION

In achievement of the foregoing as well as other objectives, the invention contemplates a heating insulating unit of improved construction and performance, and adapted for disposition between spaced, confronting, relatively rigid wall structure to serve as a thermally insulative barrier, said unit comprising a porous mass of thermally insulative material, a sealed pouch hermetically enclosing said material, and a charge of a gas having a coefficient of thermal conductivity lower than that of air enclosed in said pouch and permeating said porous mass of insulative material, the walls of said pouch being substantially impervious to said gas enclosed therein and to atmospheric gases and vapors, said walls being formed of a multi-ply laminate comprising an inwardly facing sealing layer of low density polyethylene, a layer of vinyl primer, a layer of aluminum foil, a layer of white low density polyethylene, and an outwardly facing layer of polymeric material.

The manner in which the foregoing as well as other objectives and advantages of the invention may best be achieved will be more fully understood from a consideration of the following description, taken in light of the accompanying drawing.

DESCRIPTION OF THE PREFERRED EMBODIMENT

Figure 1:
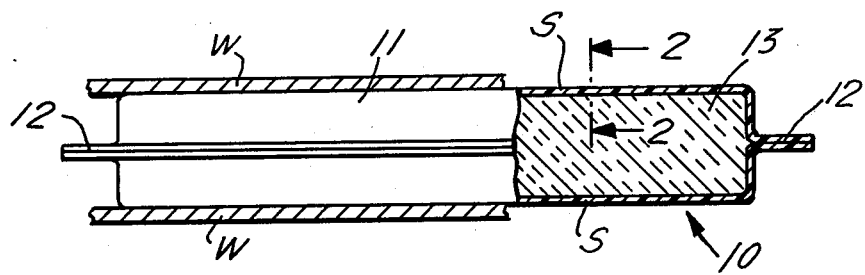
FIG. 1 is a perspective showing, with parts broken away and sectioned, of an insulating unit embodying the invention.

With more detailed reference to the drawing, there is seen in FIG. 1 spaced confronting walls W of a structure between which there is disposed a pouch 10 made from a laminate sheet material embodying the invention, and which pouch 10 includes a main portion 11 and a sealed peripheral portion 12. Pouch 10 conveniently is formed by sealing confronting surfaces of the free edge portions of a pair of rectangular sheets S of the material through application of heat and pressure in accordance with conventional practice. There is disposed within sealed pouch 10 a porous mass of material 13 of low thermal conductivity, such as, for example, a fibrous mass of glass fibers. One such material is available under the trademark "FIBERGLAS", and preferably is formed as a batt of substantial thickness and resiliency. Also, disposed within the sealed pouch 10, but not shown, is a charge of a gas having a coefficient of thermal conductivity lower than that of air. The gas preferably is difluorodichloromethane, known in the trade variously as F-12 and R-12, which gas permeates the porous mass of glass fibers comprising batt 13.

Figure 2:
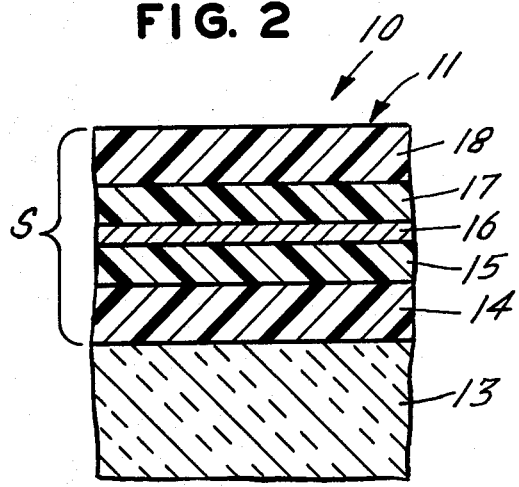
FIG. 2, is an enlarged showing taken in the plane of line 2—2 in FIG. 1, as seen looking in the direction of arrows applied thereto.

With reference to FIG. 2, the sheets S that define walls of pouch 10 are substantially impervious to the gas enclosed therein, and to atmospheric gases and vapors, as is afforded by laminate structure comprising, in the preferred quantities indicated: an inwardly facing heat sealing layer 14 of low density polyethylene that weighs about 15 pounds per ream; a layer 15 of vinyl primer that weighs about 0.5 pounds per ream and functions to ensure filling of pinholes and otherwise prime the metal foil layer 16 for lamination or adhesion to the layer 14 of low density polyethylene. Such vinyl primers are well known in the art. A layer 16 of about 0.35 mil thick metal foil, preferably aluminum; a layer 17 of white low density polyethylene that weighs about 9 pounds per ream; and an outwardly facing layer 18 of a polymeric material comprising a polyester of ethylene glycol and terephthalic acid that is about 92 gage in thickness.

Other polymeric materials found useful as the outwardly facing layer 18 comprise about 75 gage and about 100 gage oriented polypropylene.

In the manufacture of sheets S, a layer 18 of polymeric material is laminated to the bright side of foil layer 16 using the layer 17 of white low density polyethylene. The foil side of this combination of layers 16, 17, 18 is inline primed with the vinyl primer 15, and the foil side of the combination thus primed is then extrusion coated with the layer 14 of low density polyethylene.

The outwardly facing polymeric layer 18 imparts to the insulation unit a strong, puncture resistant exterior, the layer 17 adheres layer 18 to the layer 16 of foil which serves as a gas and vapor barrier, layer 15 of vinyl primer ensures filling of pinholes in the layer 16 of foil, and the inwardly facing layer 14 affords heat sealability and resistance to the glass fibers.

Advantageously, the layer 16 of foil is located near the neutral axis of the laminate structure to minimize the possibility of fracturing the foil during handling, thereby insuring integrity of the gas and vapor barrier characteristics of the structure.

While glass fiber insulation is preferred as the porous mass of thermally insulative material, it will be understood that mineral fiber as well as foamed type insulations are contemplated by the invention.

While various embodiments of the invention have been described, it will be understood that other modifications may be made without departing from the scope of the appended claims.

We claim:

1. In a thermal insulation unit comprising a porous mass of thermally insulative material, a charge of gas having a coefficient of thermal conductivity lower than that of air and permeating said porous mass of insulative material, and a sealed pouch hermetically enclosing said porous mass and gas; the improvement which comprises providing a heat sealed, puncture resistant insulating unit having vapor and gas barrier properties wherein the pouch is formed of a multi-ply laminate consisting essentially of (1) an inwardly facing sealing layer of low density polyethylene; (2) a layer of a vinyl primer; (3) a layer of metal foil; (4) a layer of white low density polyethylene; and (5) an outwardly facing layer of a polymeric material selected from the group consisting of a polyester of ethylene glycol and terephthalic acid or oriented polypropylene.

2. A unit according to claim 1, and characterized in that said metal comprises aluminum.

3. A unit according to claim 1, and characterized in that said sealing layer of low density polyethylene weighs about 15 pounds per ream, said layer of vinyl primer weighs about 0.5 pounds per ream, said layer of metal foil is about 0.35 mil thick, said layer of white low density polyethylene weighs about 9 pounds per ream, and said layer of polymeric material is from about 75 gage to about 100 gage in thickness.

4. A unit according to claim 3, and characterized in that said metal comprises aluminum.

5. A unit according to claim 3, and further characterized in that said polymeric material comprises oriented polypropylene that is about 75 gage in thickness.

6. A unit according to claim 3, and further characterized in that said polymeric material comprises oriented polypropylene that is about 100 gage in thickness.

7. A unit according to claim 3, and further characterized in that said polymeric material comprises a polyester of ethylene glycol and terephthalic acid that is about 92 gage in thickness.

8. In a thermal insulating unit comprising a porous mass of glass fiber insulation material, a charge of difluorodichloromethane gas permeating said porous mass and a sealed pouch hermetically enclosing said glass fibers and difluorodichloromethane gas, the improvement which comprises providing said glass fibers and difluorodichloromethane gas in the form of a heat sealed, puncture resistant, vapor and gas barrier insulating unit wherein the pouch is formed of a multi-ply laminate consisting essentially of (1) an inwardly facing heat sealing layer of low density polyethylene at a weight of about 15 pounds per ream; (2) a layer of vinyl primer and a weight of about 0.5 pounds per ream; (3) a layer of aluminum foil of about 0.35 mil in thickness; (4) a layer of white low density polyethylene at a weight of about 9 pounds per ream; and (5) a layer, about 75 to about 100 gage in thickness of oriented polypropylene or a polyester of ethylene glycol and terephthalic acid.

* * * * *